United States Patent [19]

The

[11] Patent Number: 4,866,355

[45] Date of Patent: Sep. 12, 1989

[54] REMOTE CONTROL OF PANNING/TILT HEAD MOTORS

[76] Inventor: Siok Bing The, Jalan Gunung Sahari V. No. 5, Jakarta-Pusat, Indonesia

[21] Appl. No.: 218,547

[22] Filed: Jul. 13, 1988

Related U.S. Application Data

[63] Continuation-in-part of Ser. No. 866,473, May 23, 1986, abandoned.

[51] Int. Cl.⁴ .............................................. H02P 1/22
[52] U.S. Cl. .................... 318/282; 318/286; 352/244
[58] Field of Search ............... 318/280, 281, 282, 283, 318/286, 287, 291, 293; 352/242, 243, 244; 358/105, 108, 210, 229

[56] References Cited

U.S. PATENT DOCUMENTS

| | | | |
|---|---|---|---|
| 2,554,080 | 5/1951 | Yardeny et al. | 318/282 |
| 2,767,363 | 10/1956 | Chubb | 318/282 X |
| 3,164,838 | 1/1965 | Heinrich | 352/243 X |
| 3,405,336 | 10/1968 | Davidoff | 318/281 X |
| 3,437,753 | 4/1969 | Stith | 358/210 |
| 4,562,477 | 12/1985 | Ogasawara et al. | 358/210 X |

*Primary Examiner*—Bentsu Ro
*Attorney, Agent, or Firm*—Watson, Cole, Grindle & Watson

[57] ABSTRACT

Apparatus for remotely controlling the movement of a panning/tilt head motor for a surveillance system is interconnected by a minimum number of conductors with the motor for bi-directional rotation of the panning/tilt head using first and second switching elements to establish manual or automatic control modes of operation and with a four-circuit, double-break switch connected between a remote active control circuit and the field coils of the motor to determine the sector rotation of said motor with engagement with stop elements manually positioned on the panning/tilt head between greater than zero degrees and 360 degrees.

8 Claims, 3 Drawing Sheets

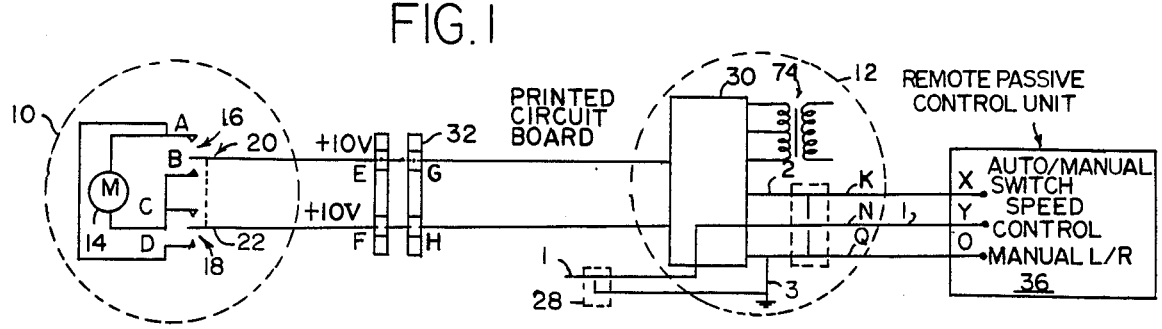
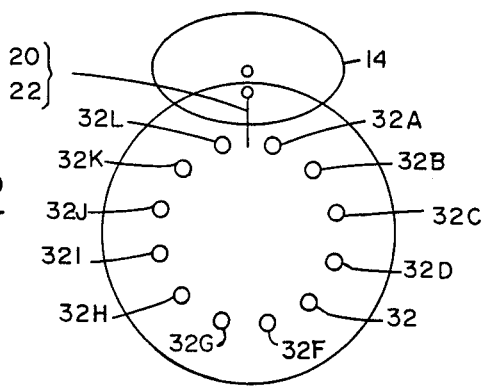
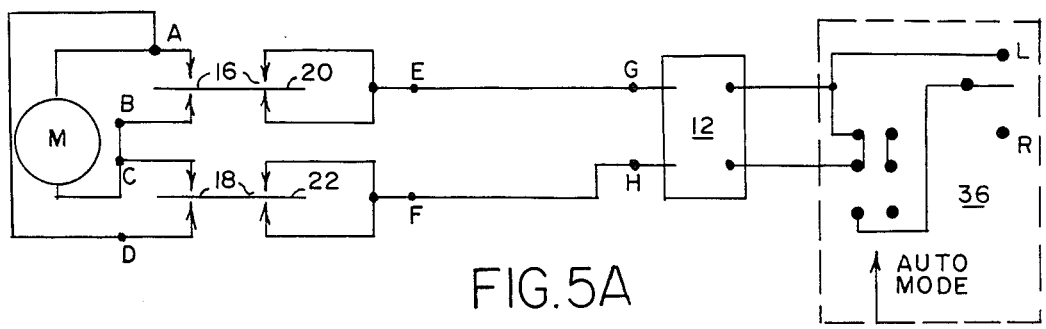
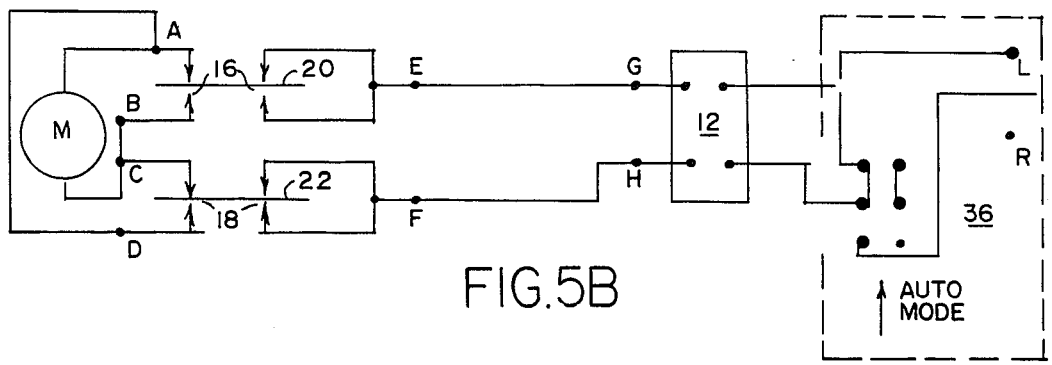

REMOTE CONTROL OF PANNING/TILT HEAD MOTORS

This application is a continuation-in-part application of application Ser. No. 866,473, filed May 23, 1986, and now abandoned.

BACKGROUND OF THE INVENTION

1. Field of the Invention

This invention relates to the control of reversibile motors and more particularly to the interconnection between a reversible motor and a remote control unit in panning/tilt head type systems.

The invention has particular application to the control of pan/tilt heads used in surveillance systems for controlling the direction of rotation of the head during both automatic and manual scanning modes of operation in which the head is caused to rotate bi-directionally or alternatively oscillate within a predetermined sector.

2. Related Art

U.S. Pat. No. 4,293,876 is directed to remote-controlled television monitoring systems in which a transmitter unit provides control signals to a video control circuit in a receiver unit which controls the positioning of a camera unit mounted on a pan/tilt unit. A circuit diagram of a video control circuit is illustrated in FIG. 8 of the patent. As set forth at column 7, lines 29 to 55, the function of the video control circuit is to selectively apply a positive or negative control voltage to a motor. A significant feature of the video control circuit disclosed in this patent is that it enables two control signals, namely either a positive or a negative voltage, to be applied on a single wire, which is advantageous in allowing the transmitter to be remotely located from the area being monitored by the camera unit.

Those of ordinary skill in the art of motor control circuitry will readily recognize that the control of the panning motor of a surveillance unit will require the use of two video control circuits, only one of which is disclosed in the aforementioned patent. That is, two such control circuits are required to provide both manual and automatic control either in a left/right operation or continuously oscillating mode. Furthermore, at least five conductors will be required, one each to provide respective plus and minus voltages, one for the auto/manual switching function, one to provide signals for left and right movements, and one line for controlling the speed of the scanning motor.

U.S. Pat. No. 3,530,268 describes an electrical circuit for control of an electrical motor and is illustrated in FIG. 8 of the patent. Closure of a main motor switch causes a motor-driven mechanism to rotate a shaft through a given angular movement until a spring arm engages a lever, which in turn actuates a switch to open one of two alternate motor circuits, and simultaneously therewith to close the other of the alternate motor circuits, thereby causing the motor-driven mechanism to rotate in the opposite direction.

The stud shaft eventually engages the lever to reverse the closed and opened positions of the respective switches in each of the alternate motor drive circuits which causes the motor-driven mechanism to rotate in the reverse direction.

It is readily apparent that this circuit has at least the disadvantages of requiring two motor drive circuits and center-tapped a transformer.

U.S. Pat. No. 4,080,629 discloses movement of a surveillance camera and which requires at least six conductors for effecting control of such movement.

SUMMARY OF THE INVENTION

One of the primary features and objects of the present invention is to overcome the aforementioned disadvantages of motor control circuits by providing control thereof without loss of control function and utilizing only a minimum number of conductors between the panning motor of a surveillance system and the control circuit.

A reduction in the number of conductors between the panning motor and the control circuit affords considerable advantage especially in those circumstances wherein very long distances are required between the panning motor and the remotely located control circuitry.

The control circuitry of the present invention also provides quick, efficient motor response with a wide operational range in both high and low temperature ambients.

Low current consumption enables considerable power loss reduction, especially in those circumstances involving long distances between the panning motor and the remotely located control circuitry.

The present invention also affords some flexibility in the relative location of the remote active control unit, the remote passive control unit and the pan/tilt head motor itself. That is, the remote active control unit may be either located with the pan/tilt head motor or with the remote passive control unit.

The remote active control unit consists of a rather simple two transistor control circuit that is known to those skilled in the motor control art. The remote active control unit may be physically located with the pan/tilt motor or with a remote passive control unit consisting of a two-position push button switch, for providing either manual or automatic modes of operation, and a three-position toggle switch to provide manual bi-directional, manual operation of the pan/tilt head motor drive system.

Regardless of the location of the remote active control unit, only a two conductor connection is required between the remote active control unit and the remote passive control unit, and a two conductor interconnection between the remote active control unit and the pan/tilt head motor assembly. With the remote active control unit located in the pan/tilt head assembly up to 60,000 feet of conductor may be used to connect the remote active control unit with the remote passive control unit. With the remote active control unit located in the remote passive control unit, up to 5,000 feet of conductor may be used to interconnect the remote active control unit with the pan/tilt head motor assembly.

Preferably the pan/tilt head motor also includes a four-circuit, double-break switch which performs the function of a double pole, double throw, ganged-switch connected to the motor drive coils to reverse the direction of actuating current of the drive motor and thus control the direction of rotation of the pan/tilt head.

In the present invention, a pair of spaced switch contacts of the four-circuit, double-break switch are mechanically actuated by rotation of the surveillance camera in each of two directions. A mechanical stopper can be set at different positions to engage the switch contacts and to vary the sector amount of oscillation of the panning motor. The displacement of the switch contacts upon contact causes a reversal of the current through the panning motor to thereby reverse the direction of motor rotation. These switch contacts are operable in the automatic mode of operation of the motor drive control system.

BRIEF DESCRIPTION OF THE DRAWINGS

The above objects, features and advantages of the invention are readily apparent from a consideration of the following description of the best mode of carrying out the invention when taken in conjunction with the drawings, wherein:

FIG. 1 illustrates the interconnection between the panning/tilt head motor assembly, the remote active control unit and the remote passive control unit;

FIG. 2 illustrates the positioning of the mechanical stopper pins on the pan head for determining the sector oscillation of the panning motor;

FIGS. 5A and 5B show the automatic mode of operation of the control circuitry in accordance with the invention.

DETAILED DESCRIPTION

Figure 3:
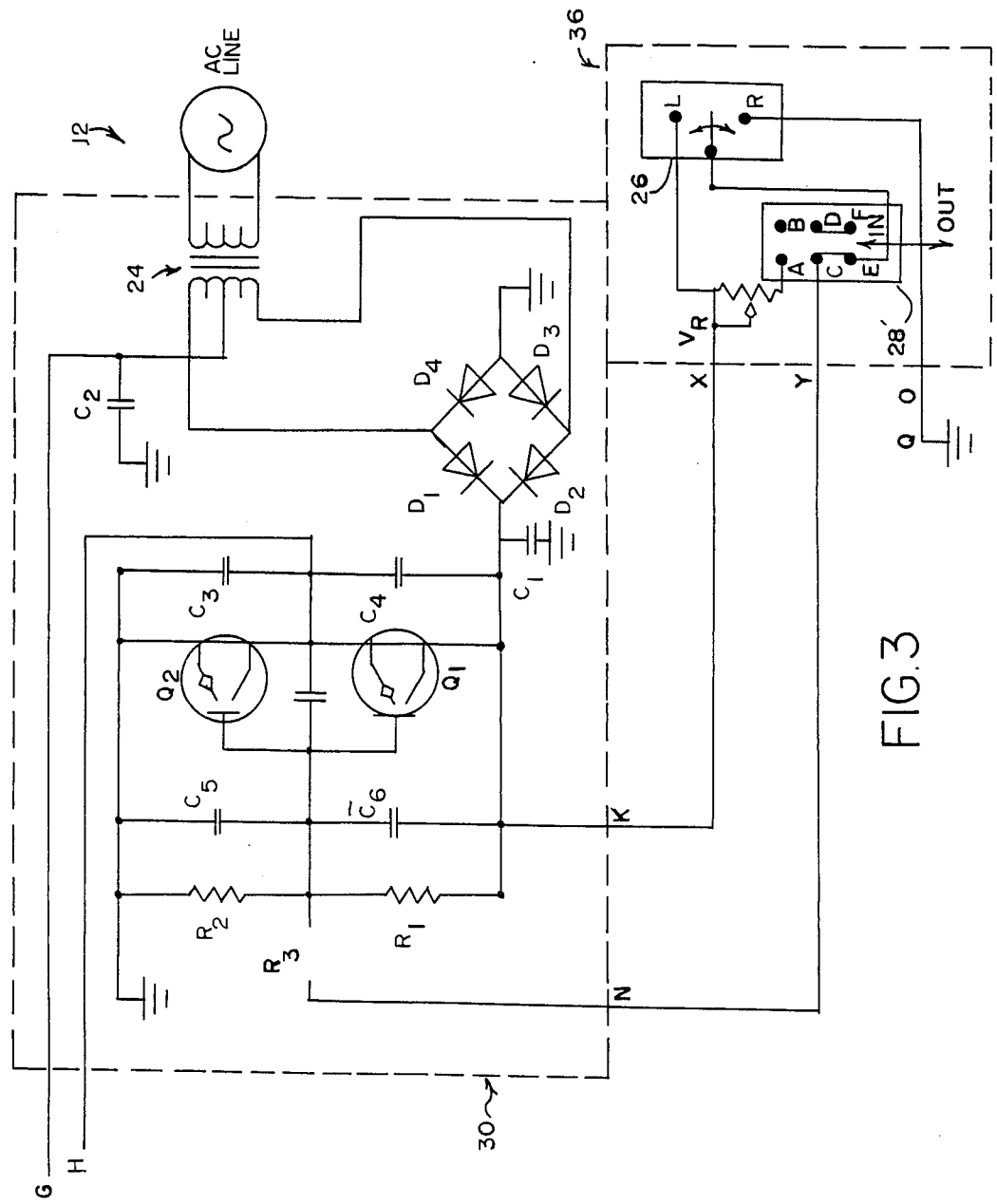
FIG. 3 shows the exemplary circuitry of the printed circuit remote active control unit and the interconnection with the toggle and push button switches of the remote passive control unit.

FIG. 1 schematically represents the interconnection between panning/tilt head motor assembly 10 and an remote active control unit 12 through terminal E-F and G-H, respectively on panning/tilt head assembly 10 and remote active control unit 12. Panning/tilt head assembly 10 includes DC motor 14 and a pair of double-throw, double pole switches (four-circuit, double break switch) 16 and 18. The movable contact 20 of switch 16 is connected to terminal E of the panning head and the movable contact 22 of switch is connected to terminal F of the panning/tilt head assembly 10. Movable contacts 20 and 22 are ganged together to provide bi-directional current flow through motor 14 to drive it in the forward or reverse directions depending upon the position of the ganged switches 16 and 18.

There are essentially two different types of control, namely remote passive control and remote active control. Typically terminals E-F and G-H in FIG. 1 may be separated by as much as 5,000 feet with the remote active control circuitry 12 located with remote passive control unit 36. Alternatively, with remote active control unit 12 housed with the panning/tilt head motor assembly 10, the remote active control unit 12 and remote passive control unit 36 may be separated by approximately 60,000 feet. Two conductor cable may be used for each of the interconnections with the use of grounded co-axial cable between the remote active control unit and the remote passive control unit.

Remote passive control unit 36 includes an automatic/manual mode control switch, speed control potentiometer and a manual left/right directional control switch, which are more fully described hereinafter.

Remote active control unit 12 includes a transformer power supply 24 and printed circuit board 30 including the circuitry schematically illustrated in FIG. 1 to provide the dc voltages for actuating panning/tilt head motor 14.

With reference to FIG. 2, ganged switch contact 20 or 22 is positioned at a selected location around the periphery of panning head motor gear 34 to engage any one or more of upstanding pins 32a to 32l to determine the sector of oscillation of the motor 14. With continuing reference to FIG. 1, with movable contact 20 contacting fixed contact A, motor 14 rotates in a given direction, e.g. clockwise. With rotation of motor 14 clockwise, the upstanding pin 32l of panning/tilt head unit 10, for example, eventually contacts movable contact 20 (22) to cause it to disengage from fixed contact A and engage fixed contact B, with ganged movable contact 22 (20) then disengaging from fixed contact C and engaging fixed contact D. This causes the current to reverse through the coils of motor 14, thereby causing it to reverse its direction and rotate the panning/tilt head counterclockwise. Eventually panning head pin 32l engages movable switch contact 20 (22) and causes it to disengage from fixed contact D and engage fixed contact C, with commensurate engagement of movable contact 20 with fixed contact A, thereby reversing the current through gear motor 14 and causing it to again rotate clockwise.

The aforementioned switching operations are repeated, thereby resulting in an oscillatory movement of motor 14 and the panning head in a full 360 degree sector scan in the automatic mode of operation. It is readily apparent that the degree of movement (sector scan) of the panning/tilt head motor 14 can be controlled within any sector defined by upstanding pins 32a to 32l by moving those pins necessary to define the desired sector to be in an upstanding position.

Furthermore, the number of pins can be increased or decreased as desired to further define the sector of oscillation of the panning/tilt head.

The circuit for controlling the voltage output to drive panning/tilt head motor 14 is known to those skilled in the art of motor control and is illustrated in FIG. 3. AC power is applied through transformer 24 to a full wave rectifier circuit consisting of diodes D1-D4 such that 20 volts DC appears across the voltage divider formed by resistors R1 and R2. Either transistor Q1 or Q2 is ON, or both transistors Q1 and Q2 are OFF, depending upon the position of push button switch 28' and toggle switch 26'. Push button switch 28' is shown in the manual mode position in FIG. 3. Line NY will be either +10 or +12 volts, line KX will be either +20 or +24 volts. With further reference to FIG. 1, if movable contacts 20 and 22 are respectively connected to terminals A and C, and toggle switch 26' is positioned to cause the motor 14 to rotate to the right (R), transistor Q2 is ON, line AD will be at +10 volts and line BC will be +3 volts such that current will flow from terminal A through the motor 14 to terminal C. If toggle switch 26' is released, transistor Q2 will be OFF. Now if toggle switch 26' is moved such that the motor is to rotate in the reverse direction (L), transistor Q1 is on, line AD is at +10 volts, line BC is at +17 volts and the current flows from terminal C through motor 14 to terminal A. The above description assumes that stopper 32 of FIG. 2 does not change the position of mechanical contacts 20 and 22.

If mechanical contacts 20 and 22 are connected respectively to terminals B and D, and toggle switch 26' is moved such that the movable terminal is connected to terminal (R), transistor Q2 is ON, line AD is at +3 volts, line BC is a +10 volts and the current flows from therminal C through motor 14 to terminal A. Also if the movable contact of toggle switch 26' is moved to terminal (L), transistor Q1 is ON, but line AD is at +17 volts, line BC is now at +10 volts and current flows from terminal A through motor 14 to terminal C. The above flow of current is opposite to that deescribed above with movable contacts 20 and 22 connected respectively to terminals A and C.

Potentiometer $V_R$ provides speed control of motor 14.

Figure 4A:
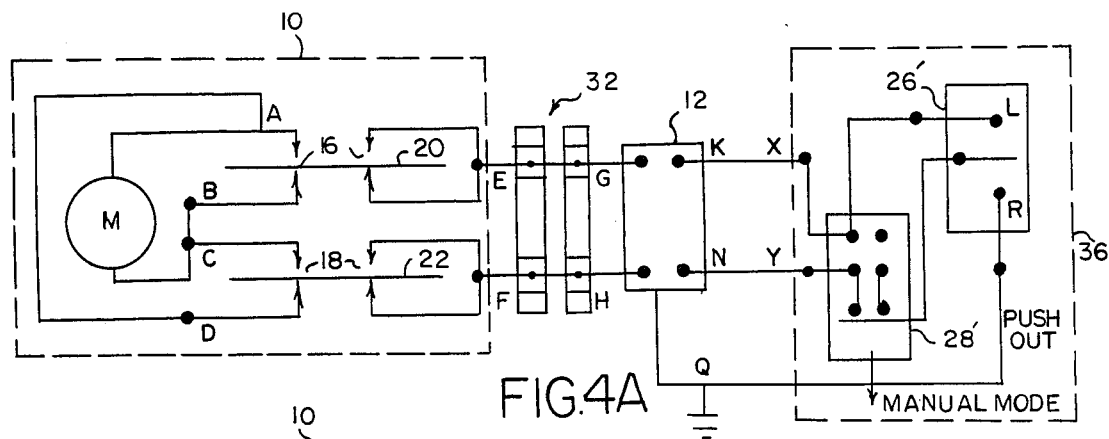
FIGS. 4A-4C show the manual mode of operation of the control circuitry in accordance with the invention.
Figure 4B:
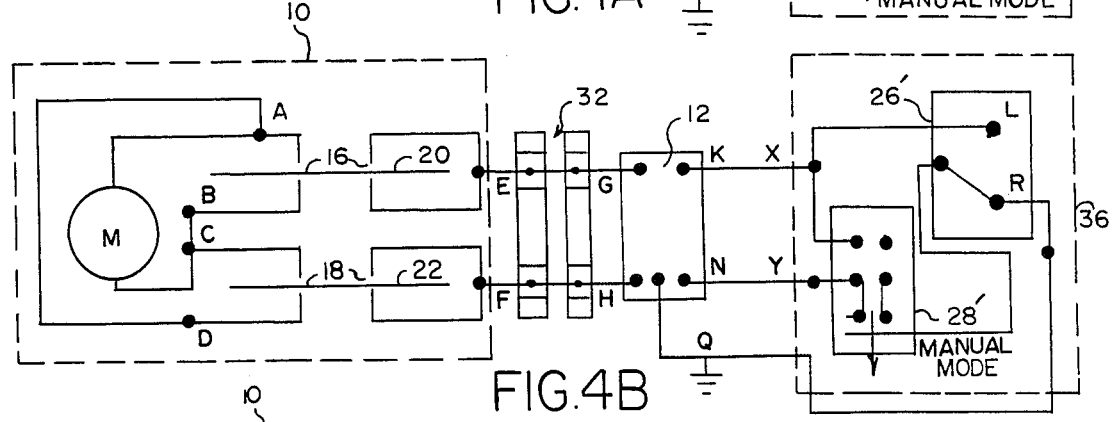
Figure 4C:
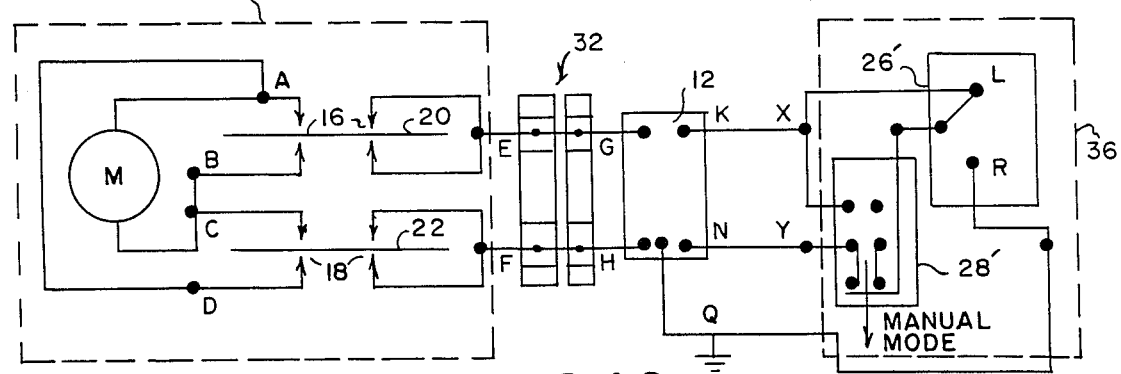

The panning/tilt head motor control system of the invention operates in either a manual or automatic mode of operation. The manual mode of operation is described with respect to FIGS. 4A, 4B and 4C. With the contacts of toggle switch 26' and push-button switch 28' as shown in FIG. 4A, both transistors Q1 and Q2 of control circuit 12 are OFF and panning/tilt motor 14 will not rotate as equal voltage is applied at terminals E and F. With the movable contact of toggle switch 26' set to terminal (R) as shown in FIG. 4B, transistor Q1 of control circuit 12 is OFF and transistor Q2 is ON, such that terminal F is at +3 volts and terminal E is at +10 volts. Finally, with the movable contact of toggle switch 26' connected to terminal (L), transistor Q1 of control circuit 12 is ON and transistor Q2 is OFF, and the voltage at terminal E is +10 volts and at terminal F, +17 volts.

The direction of rotation of motor 14 may depend upon the position of mechanical switch contacts 20, 22. However, with the toggle switch positioned as shown in FIG. 4A, the position of mechanical switch contacts 20, 22 is irrelevant, as the voltage at terminals E and F is essentially the same, and thus no current will flow through motor 14. However, with mechanical contacts 20 and 22 positioned as shown in FIG. 4B, because the voltage at terminal E is higher than that at terminal F, current flows through the motor 14 from terminal B to terminal D. However, with the mechanical switch contacts in the same position in FIG. 4C as in FIG. 4B, the direction of current flow is opposite because terminal F is at a higher voltage than terminal E, such that the current flows from terminal D to terminal B.

It should be noted that in the manual mode of operation, reversal of mechanical switch contacts 20 and 22 will not cause a reversal of direction of the current through motor 14 with toggle switch 26' set at a particular switch position. For example in the manual mode operation illustrated in FIG. 4C, reversal of mechanical switch contacts 20 and 22 causes current flow from terminal C to terminal A because terminal F is at a higher potential than terminal E. Thus, in the manual mode of operation, the direction of rotation of panning-/tilt head motor 14 is controlled by the position of toggle switch 26'.

The automatic mode of operation is shown in FIGS. 5A and 5B wherein push-button switch 36 is in the position shown such that transistor Q1 of control circuit 12 is ON and transistor Q2 is OFF. Therefore, terminal F is at +17 volts and terminal E is at +10 volts. Thus, with mechanical switch contacts 20 and 22 in the position shown in FIG. 5A, the current flow is from terminal A through the motor 14 to terminal B. Similarly, with mechanical switch contacts 20 and 2 in the position shown in FIG. 5B, the current flow is from terminal C through motor 14 to terminal A. Thus in the automatic mode of operation, the position of mechanical switch contacts 20 and 22 control the direction of rotation of panning/tilt head motor 14.

The above description is taken with respect to an exemplary embodiment of the invention and those skilled in the art of motor control will recognize modifications and variations thereof. Therefore the invention is not to be limited by the specific embodiment described herein, but by the components of the following claims and the equivalents thereof.

What is claimed is:

1. Apparatus for remotely controlling the movement of a panning/tilt head, comprising:
   a remote active control circuit for at least providing motor actuating power;
   a motor responsive to said remote active control circuit for rotating said panning/tilt head;
   first switching means for selecting at least one of manual control mode and automotive control mode of said motor and connected to actuate said remote active control circuit to provide power for controlling said motor in the automotive control mode and to condition said remote active control circuit to provide power in said manual control mode;
   second switching means for controlling power to control the direction of rotation of said motor in said manual control mode; and
   said remote active control circuit and said first and second switching means are located in a same housing and interconnected by a two conductor cable of up to 5,000 feet with said panning/tilt motor.

2. Apparatus according to claim 1, wherein said panning/tilt motor further includes ganged switching elements electrically connected to said remote active control circuit, and stop elements for determining a sector of rotation of said motor with engagement of said ganged switching elements with said stop elements upon rotation of said motor to reverse the direction of rotation thereof.

3. Apparatus according to claim 2, wherein said stop elements can be positioned to define the sector of rotation of said motor from greater than zero degrees to 360 degrees.

4. Apparatus according to claim 3, wherein said ganged switching elements are a four-circuit, double-break switch.

5. Apparatus for remotely controlling the movement of a panning/tilt head comprising:
   a remote active control circuit for at least providing motor actuating power;
   a motor responsive to said remote active control circuit for rotating said panning/tilt head;
   first switching means for selecting at least one of manual control mode and automotive control mode of said motor and connected to actuate said remote active control circuit to provide power for controlling said motor in the automatic control mode and to condition said remote active control circuit to provide power in said manual control mode;
   second switching means for controlling power to control the direction of rotation of said motor in said manual control mode; and
   said remote active control circuit is housed with said panning/tilt motor and electrically interconnected with said first and second switching means by up to 60,000 feet of a two conductor shielded cable.

6. Apparatus according to claim 5, wherein said panning/tilt motor further including ganged switching elements electrically connected to said remote active control circuit, and stop elements for determining a sector of rotation of said motor with engagement of said ganged switching elements with said stop elements upon rotation of said motor to reverse the direction of rotation thereof.

7. Apparatus according to claim 6, wherein stop elements can be positioned to define the sector of rotation of said motor from greater than zero degrees to 360 degrees.

8. Apparatus according to claim 7, wherein said ganged switching elements are a four-circuit, double-break switch.

* * * * *